March 3, 1970      A. O. COLINA      3,497,907
SNAP-FITTED HINGE ASSEMBLY
Filed July 26, 1967
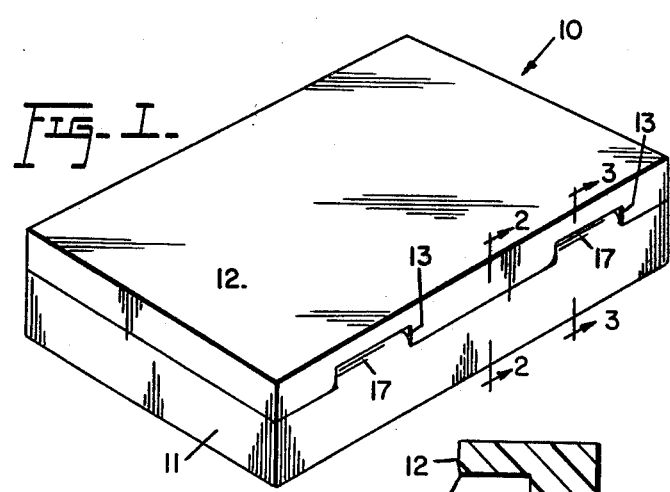
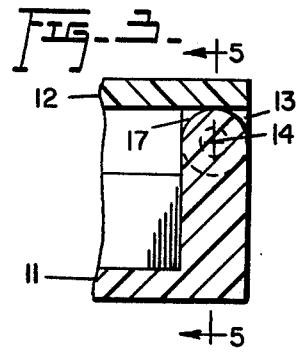
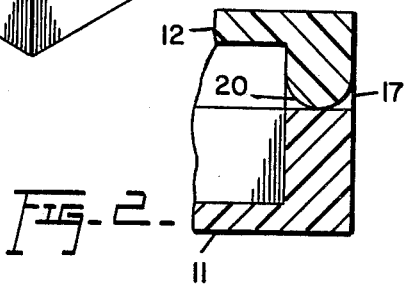
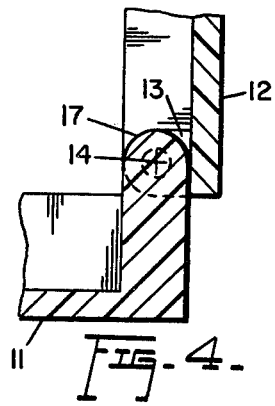
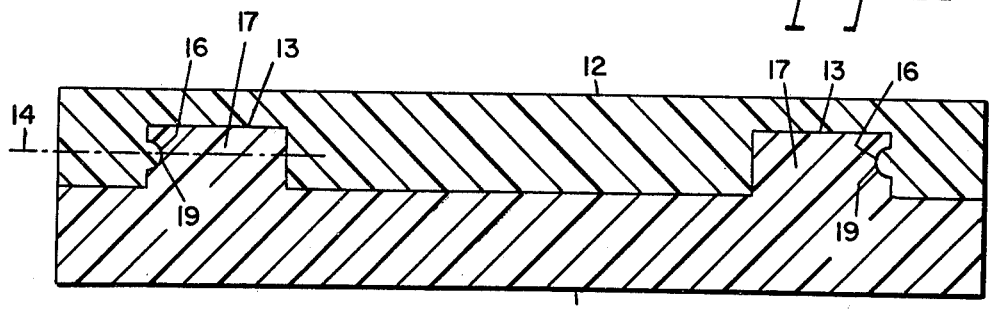
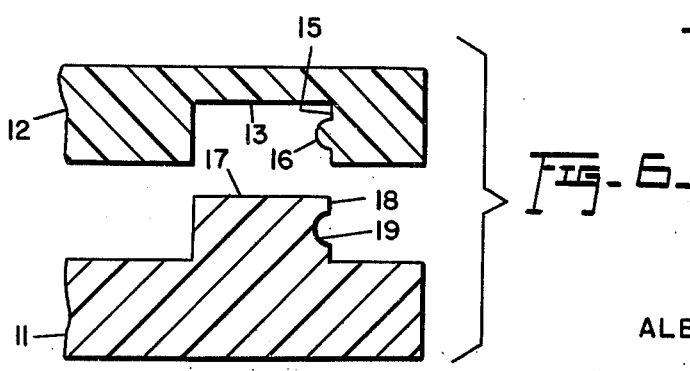
INVENTOR:
ALBERTO ORTIZ COLINA
By: *Kurt Kelman*
Agent United States Patent Office 3,497,907
Patented Mar. 3, 1970

3,497,907
SNAP-FITTED HINGE ASSEMBLY
Alberto O. Colina, Golf 151, Mexico City 21, Mexico
Filed July 26, 1967, Ser. No. 656,105
Int. Cl. E05d 7/10
U.S. Cl. 16—171        1 Claim

ABSTRACT OF THE DISCLOSURE

A hinge member provided with recesses having surfaces perpendicular to the hinge axis equipped with detents, and a second hinge member having projections extending into the recesses and formed with depressions in which the detents are seated. The material of the hinge members has sufficient yieldability to permit the detents to be snap-fitted into the depressions during assembly of the hinge.

---

This invention relates to new and useful improvements in hinge construction, and the principal object of the invention is to provide a very simple, economically manufactured and easily assembled hinge structure in which the hinge members are formed integrally with the parts to be hinged and also with means interconnecting the hinge members themselves, so that it is not at all necessary to utilize fastening screws, rivets, adhesive, hinge pins, et cetera, as in conventional hinges.

As such, the hinge structure of the invention is particularly suitable for use in connecting together the bottom and the lid of boxes and other similar containers made of plastics or other suitable material, wherein one member of the hinge is formed integrally with one component of the box, for example the lid, by providing the lid with recesses having faces equipped with detents. The second member of the hinge is formed integrally with the other component of the box, for example the box bottom, by providing the same with projections which extend into the recesses and are formed with depressions for seating the detents. The material of the box is sufficiently yieldable to permit the detents to be snap-fitted into the depressions for a quick and easy attachment of the lid to the bottom of the box.

With the foregoing more important object and features in view and such other objects and features as may become apparent as this specification proceeds, the invention will be understood from the following description taken in conjunction with the accompanying drawings, wherein like characters of reference are used to designate like parts, and wherein:

FIG. 1 is a perspective view of a box-like container embodying the hinge structure of the invention;

FIG. 2 is an enlarged, fragmentary sectional view, taken substantially in the plane of the line 2—2 in FIG. 1;

FIG. 3 is an enlarged, fragmentary sectional view, taken substantially in the plane of the line 3—3 in FIG. 1;

FIG. 4 is a view, similar to that shown in FIG. 3, but with the container lid in the open position;

FIG. 5 is a longitudinal sectional view, taken substantially in the plane of the line 5—5 in FIG. 3; and FIG. 6 is a fragmentary group illustration showing the two hinge members in section, prior to their assembly.

Referring now to the accompanying drawings in detail, the hinge structure of the invention is particularly well suited for connecting together such parts as, for example, the bottom and the lid of inexpensive box-like containers such as the plastic container 10 shown in FIG. 1, although it will be understood that the use of the invention is not restricted to this particular environment.

The container 10 comprises a bottom portion 11 and a lid 12, and since the hinge structure of the invention consists of two hinge members which are formed integrally with the respective components 11 and 12 of the container, the two hinge members may be designated by the same reference numerals.

One of the hinge members, for example the member 12, is provided in a side edge portion thereof with recess means which may be constituted by a pair of recesses 13 which are spaced longitudinally along the hinge axis 14 and have a pair of end surfaces 15 perpendicular to the hinge axis formed with substantially semi-spherical detents 16.

The second hinge member 11 is provided on its corresponding side edge portion with projection means which may be constituted by a pair of projections 17, the latter extending into the recesses 13 and having perpendicular end surfaces 18 provided with substantially semi-spherical depressions 19. The plastic or other suitable material of the hinge members 11, 12 possesses sufficient yieldability to permit the detents 16 to be snap-fitted into the depressions 19 during assembly of the hinge and, of course, the detents are rotatably seated in the depressions to facilitate the hinging action, as will be apparent from FIGS. 3 and 4. Since the hinge members are integrally formed with the components 11, 12, they may be economically manufactured and easily assembled without the need for fastening elements, hinge pins, et cetera, required when conventional separate hinges are employed.

It will be understood that the projections 17 are of substantially the same length as the recesses 13 to prevent displacement of the parts 11, 12 along the axis of the hinge and to retain the detents 16 in the depressions 19 after snap-fitting of the parts. Portions of the member 12 between and beyond the recesses 13 may be rounded as indicated at 20 in FIG. 2, so as not to interfere with the hinge movement.

It will be observed that in the particular arrangement shown in the drawings the detents 16 are provided on the surfaces 15 which are oriented in opposite directions on the hinge axis, that is, toward each other, so that the detents 16 are in mutually opposing relation. However, several alternative arrangements are possible, for example, the detents may both face in the same direction, or they may be provided on the inner end surfaces rather than on the outer end surfaces of the recesses, with a corresponding relocation of the depressions 19 in the projections 17. Also, the detents may be provided on the projections if the depressions are provided in the recesses, instead of the illustrated arrangement where the detents are in the recesses and the depressions are in the projections. Moreover, the recesses may be in the member 11 instead of the member 12, if the projections are on the member 12 instead of the member 11. Also, the recesses and projections may each be more than two in number or, alternatively, one long recess and one long projection may exist instead of the two, as shown. All these variations are believed to be so self-evident and inherent in the structure illustrated that separate showings thereof are not necessary.

While in the foregoing there has been described and shown the preferred embodiment of the invention, various modifications and equivalents as noted above may be apparent to those skilled in the art to which the invention relates. Accordingly, it is not desired to limit the invention to this disclosure and various modifications and equivalents may be resorted to, falling within the spirit and scope of the invention as claimed.

What is claimed as new is:

1. Hinge means for connecting a cover to a container wherein the container has an upstanding side wall and the cover has a depending side wall coplanar with the side wall of the container, said hinge means being characterized in that the hinge axis is disposed centrally within the thickness of said side walls and that the side walls are formed to provide a set of recesses and projections alternately in the upper edge portion of the container side wall and in the lower edge portion of the cover side wall, the recesses and projections in each set being spaced longitudinally along the hinge axis with the projections on the container side wall being interfitted in the recesses in the cover side wall and vice versa, said projections having semi-cylindrical surfaces concentric with the hinge axis and said recesses having flat surfaces tangential to said semi-cylindrical surfaces whereby the projections always close the recesses in both the closed and open positions of the cover, said projections being of the same axial length as the recesses in which they are interfitted and coacting with the recesses to provide pairs of abutting faces perpendicular to the hinge axis, and axially projecting detents provided on one of the faces in a pair and engaging depressions formed in the other face of the pair whereby to constitute said hinge means, said side walls being formed from material possessing sufficient yieldability to permit said detents to be snap-fitted into said depressions during assembly of the hinge means.

References Cited

UNITED STATES PATENTS

| | | |
|---|---|---|
| 2,624,907 | 1/1953 | Graham. |
| 2,145,143 | 1/1939 | Trecartin _____ 16—171 |
| 3,086,676 | 4/1963 | Dilatush. |
| 3,394,835 | 7/1968 | Peterson. |

BOBBY R. GAY, Primary Examiner

D. L. TROUTMAN, Assistant Examiner